Figure 1:
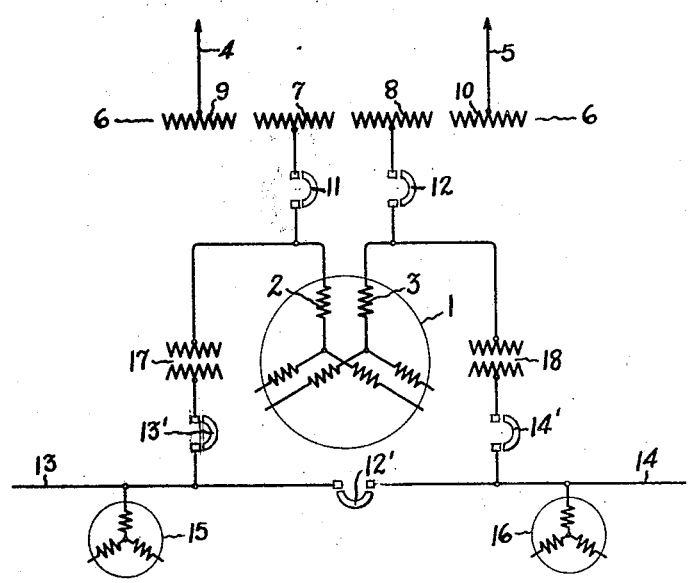

July 21, 1931.  T. F. BARTON  1,815,824

ELECTRIC POWER SYSTEM

Filed May 22, 1929

Inventor:
Theophilus F. Barton,
by Charles E. Mullan
His Attorney

Patented July 21, 1931

1,815,824

UNITED STATES PATENT OFFICE

THEOPHILUS F. BARTON, OF UPPER MONTCLAIR, NEW JERSEY, ASSIGNOR TO GENERAL ELECTRIC COMPANY, A CORPORATION OF NEW YORK

ELECTRIC POWER SYSTEM

Application filed May 22, 1929. Serial No. 365,198.

My invention relates to electric power systems and more particularly to means for supplying power to the auxiliary power consuming devices, such as motor operated air pumps, water pumps, blowers and the like, of a steam-turbine or similar prime-mover electric power generating station.

In prime mover generating-stations operating on the unit plan, it is important to maintain adequate voltage on the auxiliary bus for energizing auxiliary power consuming devices operating station auxiliaries under all conditions of operation on the main system as long as the prime mover is available for producing power. Since electrical energy may be generated more economically with a large unit than with a small unit, it is desirable to energize the station auxiliaries from the main generator bus. However, if power is supplied in the usual manner to the auxiliaries from the main bus through a transformer with no synchronous equipment connected to the auxiliary bus, the voltage of the auxiliary bus is entirely determined by the voltage of the main bus and any disturbances, such as short circuits or overloads in the main system, may cause the voltage on the auxiliary bus to drop sufficiently to cause a shut down of the entire station. Accordingly, one of the usual arrangements in the past has been to provide a so-called floating house turbine and generator connected to the auxiliary bus for emergency conditions, with the normal energy supply for the auxiliary bus from a house transformer connected to the main station bus. While the auxiliary floating unit provides increased reliability of operation for the auxiliary power consuming devices of the station, the arrangement is obviously more expensive than if the power supply could be obtained solely from the main generating units.

It is an object of my invention to provide an improved arrangement of power supply for auxiliary power consuming devices of an electric power generating station solely from the main generating units whereby the voltage for the auxiliary power consuming devices may be maintained at a satisfactory operating value during disturbances and abnormal operating conditions in the system energized by the main generating unit.

A further object of my invention is to provide a new and improved arrangement of power supply for auxiliary power consuming devices of an electric power generating station solely from a plurality of main generating units, one of which may be of the independent multiple-winding type, whereby upon the occasion of short-circuit or abnormal conditions in the system energized by the main generating units the station auxiliaries may be operated satisfactorily from the main generating unit for an emergency period.

The novel features which I believe to be characteristic of my invention are set forth with particularity in the appended claims. The invention itself, however, both as to organization and method of operation, together with further objects and advantages thereof, will best be understood by reference to the following description taken in connection with the accompanying drawings in which Fig. 1 is a diagrammatic representation of one embodiment of my invention used in connection with a double-winding generator and Fig. 2 shows an embodiment of my invention used in connection with two generators supplying power to the main system.

Figure 2:
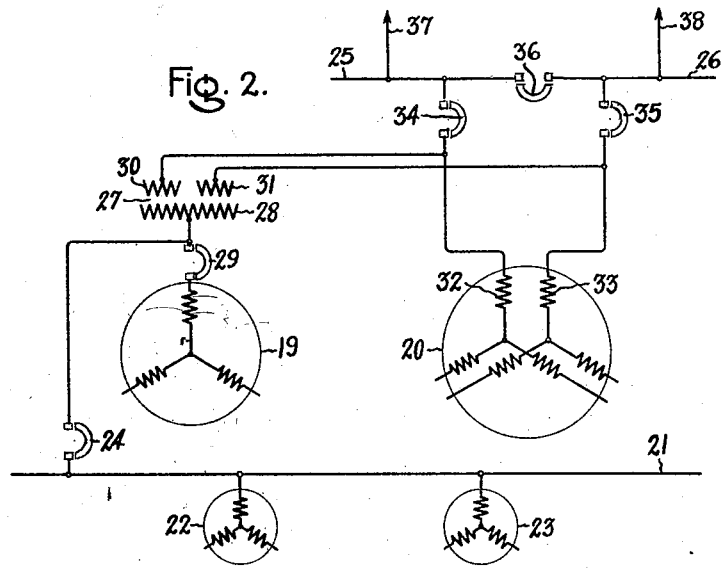

Referring to Fig. 1 of the drawings, 1 indicates a main generating unit of the double-winding type having two separately insulated stator windings 2 and 3. For purposes of simplicity a one line diagrammatic representation has been used in this figure as well as in Fig. 2 to illustrate all of the circuits except the armature circuits of the dynamo-electric machines. Although various known types of multiple-winding generators may be used without departing from my invention in its broader aspects, a particular type of multiple-winding generator which is applicable for use in installations of the type where my invention finds commercial application is one in which two complete windings are arranged in alternate slots in the stator core as described and claimed in an application of Delmar D. Chase, Serial No. 276,467, filed May 9, 1928, and assigned to the same assignee as this application. This winding consists of two separate circuits with the coil sides of corresponding phase belts of different circuits distributed in alternate slots around the complete periphery of the stator core. The reactance between the windings is such that a short circuit or abnormal load condition imposed upon one winding does not materially affect the voltage of the other winding. Each winding of generator 1 is connected to energize different distribution circuits designated as 4 and 5. These circuits may be feeder circuits connected to bus sections energized by the respective generator windings, but for illustrative purposes I have represented the distribution circuits as high voltage transmission lines interconnected with the generator windings 2 and 3 through a transformer 6 which is preferably connected and arranged in accordance with the arrangement described and claimed in an application of Frazer W. Gay, Serial No. 230,227, filed November 1, 1927, and assigned to the same assignee as this application. Accordingly, transformer 6 is provided with two separately insulated primary windings 7 and 8 connected to the generator windings 2 and 3 respectively, and two separately insulated secondary windings 9 and 10 connected to the distribution circuits 4 and 5, respectively. The secondary windings 9 and 10 are so arranged with respect to the primary windings that the reactance of each secondary winding is high with respect to the primary windings, whereas, the reactance of all the secondary windings when substantially uniformly loaded is low with respect to the primary windings. A suitable switch 11, for example, the usual type of oil switch, is interposed between generator winding 2 and the transformer winding 7 to isolate the generator winding 2 from the system whenever it is found desirable or necessary to disconnect the generator from the system. Similarly, a switch 12 is interposed between the generator winding 3 and the transformer winding 8.

In accordance with my invention the auxiliary power consuming devices are connected at a point in the main generating system so that the reactance of the generator windings as well as the transformer windings are included before reaching the point of short circuit or disturbance which may exist on the main system. Two bus sections 13 and 14 which may be provided with a bus sectionalizing switch 12' normally in a circuit interrupting position are provided for energizing the auxiliary power consuming devices which are diagrammatically represented by motors 15 and 16. Bus 13 is energized from generator winding 2 through a suitable transformer 17 and switch 13', and bus 14 is similarly energized from generator winding 3 through a suitable transformer 18 and switch 14'.

With this arrangement two sources of power are available for energizing the auxiliary bus and with the auxiliary power consuming devices divided between two sections of the auxiliary bus a system is provided which insures that a lowering of voltage on either section will not interfere with the operation of the main generating unit during an emergency period incident to a short circuit on a given feeder or distribution circuit.

In Fig. 2 of the drawings I have shown another embodiment of my invention in which the bus for the auxiliaries is energized from two main sources of energy in such a manner that a relatively large reactance is connected between the main bus supplied by said main sources of energy and the auxiliary bus in a manner to sustain the voltage on the auxiliary bus upon the occasion of disturbances or abnormal load conditions on the main bus or system energized thereby. The two sources of energy for energizing the auxiliary bus in this arrangement are illustrated as two alternating current generators 19 and 20. These generators may be driven by any suitable prime-mover or prime-movers (not shown) but in systems utilizing turbines of the high pressure "cross-compound" type, generator 19 may be driven by the high pressure unit and generator 20 by the low pressure unit. Generator 19 is preferably wound for the voltage required by the station auxiliaries and directly connected to supply energy to the station auxiliary bus 21 which is provided for energizing the station auxiliary units diagrammatically represented as motors 22 and 23. A suitable circuit interrupting device 24 is interposed between the auxiliary bus and the generator terminals. Generator 19 is also connected to supply power to the main bus comprising sections 25 and 26 through a suitable transformer 27, preferably of the three-winding type and shown as comprising a primary winding 28 connected to be directly energized from generator 19 through a suitable switch 29, and two secondary windings 30 and 31 connected to energize busses 25 and 26 respectively. Where the double-winding generator principle, as described and claimed in my application, Serial No. 276,469, filed May 9, 1928, and assigned to the same assignee as this application, can be used to advantage, the generator 20 is provided with a stator winding of the double-winding type, such as is described and claimed in the aforementioned Chase application. Generator 20 is, therefore illustrated with two separately insulated windings 32 and 33 which are connected to energize bus sections 25 and 26, respectively, and are, accordingly, connected in parallel with transformer windings 30 and 31 respectively. Suitable switches 34 and 35, for example of the usual type of oil switch, are interposed between generator 20 and the bus sections 25 and 26. The bus sections 25 and 26 also have interposed therebetween a suitable bus sectionalizing switch 36. The distribution circuits energized by busses 25 and 26 are indicated diagrammatically by feeders 37 and 38, respectively.

With the arrangement just described, it will be noted that the auxiliary bus has three possible sources of supply: first from the generator 19; second from section 25 of the main bus; and third, from section 26 of the main bus. Any disturbance or short circuit on the circuits 37 and 38 supplied by the main bus sections will not affect the voltage of the auxiliary bus appreciably. For example, if a fault occurs on bus 26 it will not appreciably affect the voltage of generator winding 32 due to the reactance between generator winding 32 and the fault, and similarly because of the high reactance to the fault between the winding of transformer primary winding 28 and the secondary winding 31 subjected to the fault. Hence the auxiliary bus voltage tends to be maintained because generator 19 tends to maintain its voltage as well as generator winding 32 in the particular conditions assumed.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In an electric power system, a main source of supply including an alternating current generator having a plurality of separately insulated armature windings, a plurality of main distribution circuits connected respectively to different armature windings, auxiliary power consuming devices associated with said power system, and a bus for energizing said auxiliary power consuming devices connected to be energized solely from said main source of supply.

2. In an electric power system, a main source of supply including an alternating current generator having a plurality of separately insulated armature windings, a plurality of main distribution circuits connected respectively to different armature windings, auxiliary power consuming devices associated with said power system, a bus for energizing said auxiliary power consuming devices connected to be energized solely from said main source of supply, and transforming means having windings connected respectively to different armature windings and interconnecting said armature windings and said bus.

3. In an electric power system, a main high-voltage bus comprising a plurality of sections, one main source of supply comprising an alternating current generator having a plurality of separately insulated windings each connected to a different section of said main bus, an auxiliary relatively low voltage bus, auxiliary power consuming devices connected to said auxiliary bus, a second main source of supply comprising an alternating current generator directly connected to said auxiliary bus, and transforming means for connecting said second mentioned generator in parallel with the separately insulated windings of said first mentioned generator normally to supply power jointly to said main bus and to said auxiliary bus.

4. In an electric power system, a main bus comprising a plurality of sections, an alternating current generator having a plurality of separately insulated armature windings connected respectively to different sections of said main bus, an auxiliary bus, auxiliary power consuming devices connected to said auxiliary bus, a second alternating current generator directly connected to said auxiliary bus, and a transformer for interconnecting said alternating current generators and having a plurality of separately insulated windings connected respectively to different armature windings of said multiple-winding generator and a winding connected to said second mentioned generator.

5. In an electric power system, a main bus comprising a plurality of sections, an alternating current generator having two separately insulated windings connected respectively to different sections of said main bus, an auxiliary bus, auxiliary power consuming devices connected to said auxiliary bus, a second alternating current generator directly connected to said auxiliary bus, and a transformer for interconnecting said alternating current generators and having a winding connected to said second alternating current generator and two windings connected respectively to different windings of said first mentioned generator and arranged in inductive relation to said first mentioned transformer winding so that for a uniform distribution of load on said two separately insulated transformer windings the impedance thereof is low with respect to said first mentioned transformer winding and comparatively great to an abnormal current flowing in one of said separately insulated transformer windings.

In witness whereof, I have hereunto set my hand, this 20 day of May, 1929.

THEOPHILUS F. BARTON.